(12) United States Patent
Hawley et al.

(10) Patent No.: US 10,618,512 B2
(45) Date of Patent: Apr. 14, 2020

(54) EXPANDING ELECTRIC VEHICLE MODE DURING DOWNHILL GRADE CONDITIONS

(71) Applicant: Toyota Motor Engineering & Manufacturing North America, Inc., Plano, TX (US)

(72) Inventors: Thomas S. Hawley, Ann Arbor, MI (US); Shingo Eto, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 209 days.

(21) Appl. No.: 15/669,876

(22) Filed: Aug. 4, 2017

(65) Prior Publication Data
US 2019/0039600 A1   Feb. 7, 2019

(51) Int. Cl.
*B60W 20/40*    (2016.01)
*B60W 30/18*    (2012.01)
(Continued)

(52) U.S. Cl.
CPC ............ *B60W 20/40* (2013.01); *B60K 6/48* (2013.01); *B60W 10/026* (2013.01); *B60W 10/06* (2013.01); *B60W 10/08* (2013.01); *B60W 10/10* (2013.01); *B60W 30/18072* (2013.01); *G08G 1/096708* (2013.01); *B60W 2420/42* (2013.01); *B60W 2510/0633* (2013.01); *B60W 2510/0638* (2013.01); *B60W 2510/081* (2013.01); *B60W 2510/244* (2013.01); *B60W 2520/10* (2013.01); *B60W 2540/106* (2013.01); *B60W 2540/12* (2013.01); *B60W 2550/142* (2013.01); *B60W 2550/20* (2013.01); *B60W 2710/023* (2013.01); *B60W 2710/024* (2013.01); *B60W 2710/0666* (2013.01); *B60W 2710/0677* (2013.01); *B60W 2710/083* (2013.01); *B60W 2710/1038* (2013.01); *Y10S 903/912* (2013.01);
(Continued)

(58) Field of Classification Search
None
See application file for complete search history.

(56) References Cited

U.S. PATENT DOCUMENTS 5,832,396 A   11/1998  Moroto
6,558,289 B2 *  5/2003  Chung ............... B60K 6/365
                                                     477/3
(Continued)

FOREIGN PATENT DOCUMENTS

CN    203142372 U  *  8/2013
EP         1215071      9/2005

*Primary Examiner* — Shelley Chen
(74) *Attorney, Agent, or Firm* — Sheppard, Mullin, Richter & Hampton LLP; Hector A. Agdeppa; Daniel N. Yannuzzi

(57) ABSTRACT

System and methods are provided for improving fuel economy of a hybrid vehicle. A hybrid vehicle may include an EV driving mode, where the motor alone powers the hybrid vehicle. However, use of such a driving mode may be limited to conditions involving low drive force and power requests due to motor and battery power specifications. In some circumstances, the conditions during which the motor can be used to power the hybrid vehicle can be expanded. Such conditions may include instances where the driver only seeks light accelerations for a short period of time. Such an expanded EV mode may be triggered when the hybrid vehicle is travelling a downhill grade.

10 Claims, 6 Drawing Sheets

(51) Int. Cl.
  *B60W 10/06*   (2006.01)
  *B60W 10/08*   (2006.01)
  *B60W 10/02*   (2006.01)
  *B60W 10/10*   (2012.01)
  *G08G 1/0967*  (2006.01)
  *B60K 6/48*    (2007.10)

(52) U.S. Cl.
  CPC .......... *Y10S 903/93* (2013.01); *Y10S 903/945* (2013.01); *Y10S 903/946* (2013.01)

(56) References Cited

U.S. PATENT DOCUMENTS

| | | | |
|---|---|---|---|
| 8,326,510 B2* | 12/2012 | Tang | B60L 7/18 180/197 |
| 8,374,740 B2 | 2/2013 | Druenert | |
| 8,566,013 B2 | 10/2013 | Davis | |
| 8,727,049 B1* | 5/2014 | Rosen | B60W 10/06 180/65.265 |
| 9,039,568 B2 | 5/2015 | Banker | |
| 9,052,013 B2 | 6/2015 | Landes | |
| 9,205,841 B2 | 12/2015 | Williams | |
| 9,211,804 B2 | 12/2015 | Preece | |
| 9,464,407 B2 | 10/2016 | Stutchbury | |
| 9,561,792 B2 | 2/2017 | Kodawara | |
| 10,086,827 B2* | 10/2018 | Lee | B60W 20/40 |
| 2002/0061802 A1* | 5/2002 | Chung | B60K 6/365 477/3 |
| 2004/0167705 A1 | 8/2004 | Lingman | |
| 2007/0124037 A1* | 5/2007 | Moran | B60K 6/12 701/22 |
| 2010/0090650 A1 | 4/2010 | Yazami | |
| 2011/0106388 A1 | 5/2011 | Boeckenhoff | |
| 2011/0320078 A1* | 12/2011 | McGill | B60K 6/48 701/22 |
| 2013/0018538 A1* | 1/2013 | Miura | B60R 16/0236 701/22 |
| 2013/0096808 A1 | 4/2013 | DeLaSalle | |
| 2013/0151047 A1* | 6/2013 | Choi | B60L 15/2045 701/22 |
| 2013/0204490 A1 | 8/2013 | Pfefferl | |
| 2013/0239750 A1* | 9/2013 | Schiek | B60K 6/40 74/665 B |
| 2014/0088810 A1 | 3/2014 | Gehring | |
| 2014/0114514 A1 | 4/2014 | Crombez | |
| 2014/0139156 A1* | 5/2014 | Hayashi | H02P 21/02 318/400.3 |
| 2014/0148986 A1 | 5/2014 | Yoshikawa | |
| 2014/0163800 A1* | 6/2014 | Watanabe | B60K 6/445 701/22 |
| 2014/0228168 A1* | 8/2014 | Kaufman | B60K 6/442 477/5 |
| 2014/0244120 A1 | 8/2014 | Fujii | |
| 2014/0296026 A1* | 10/2014 | Wenzel | B60K 6/36 477/5 |
| 2015/0046076 A1 | 2/2015 | Costello | |
| 2016/0052511 A1* | 2/2016 | Takeuchi | F02N 5/04 701/22 |
| 2016/0109328 A1 | 4/2016 | Kanke | |
| 2016/0137185 A1 | 5/2016 | Morisaki | |
| 2016/0193992 A1* | 7/2016 | Hancock | B60K 6/48 701/22 |
| 2016/0200315 A1 | 7/2016 | Fracchia | |
| 2016/0243947 A1 | 8/2016 | Perkins | |
| 2016/0243958 A1 | 8/2016 | Miller | |
| 2016/0244044 A1 | 8/2016 | Miller | |
| 2016/0264144 A1 | 9/2016 | Fontvieille | |
| 2017/0021730 A1 | 1/2017 | Ogawa | |
| 2017/0021820 A1 | 1/2017 | Ogawa | |
| 2017/0021823 A1 | 1/2017 | Ogawa | |
| 2017/0182998 A1* | 6/2017 | Hatsuda | B60W 10/02 |
| 2017/0355358 A1 | 12/2017 | Ogawa | |
| 2018/0001884 A1 | 1/2018 | Itagaki | |
| 2018/0010529 A1 | 1/2018 | Xiao | |
| 2018/0065619 A1 | 3/2018 | Kim | |
| 2018/0073593 A1 | 3/2018 | Kawamura | |
| 2018/0093655 A1 | 4/2018 | Healy | |
| 2018/0162382 A1 | 6/2018 | Colavincenzo | |
| 2018/0178774 A1 | 6/2018 | Katsumata | |
| 2018/0236994 A1 | 8/2018 | Healy | |
| 2018/0257473 A1 | 9/2018 | Follen | |

* cited by examiner

EXPANDING ELECTRIC VEHICLE MODE DURING DOWNHILL GRADE CONDITIONS

TECHNICAL FIELD

The present disclosure relates generally to expanding the conditions under which a hybrid vehicle can be operated in an electric vehicle mode. In some embodiments, the conditions under which the EV mode can be used may be expanded to include downhill grade conditions.

DESCRIPTION OF RELATED ART

Hybrid vehicles have become increasingly popular among consumers concerned with their environmental impact and with increasing fuel economy. Hybrid vehicles generally utilize an engine, e.g., an internal combustion engine, along with an electric motor, which can also operate as a generator to provide energy to a battery that powers the electric motor. The electric motor may then provide power to the wheels so that under certain driving conditions, the hybrid vehicle may even solely run on the electric motor.

Under certain conditions, it may be advantageous to operate a hybrid vehicle using only its electric motor. To take advantage of such conditions, hybrid vehicles are often equipped with an electric vehicle mode ("EV mode") that prevents the engine from turning on. However, the conditions under which the EV mode can be used in conventional hybrid vehicles are limited. Those conditions may include coasting conditions or conditions in which the conventional hybrid vehicle is accelerating at a rate below a particular acceleration threshold. For example, a driver's request to initiate an EV mode can be overridden when the conventional hybrid vehicle is no longer coasting or surpasses the aforementioned acceleration threshold. Under these conditions, it is assumed that the drive power requested of the hybrid vehicle is too large to provide solely with the electric motor. When the EV mode is overridden, the engine is switched on in order to provide a higher drive power request. However, when a driver intends to accelerate for only a brief moment, and resume operating the hybrid vehicle at lower drive power that might normally fall within conventional EV mode conditions, the driver must repeatedly enable the EV mode again and again. This can cause the hybrid vehicle to switch the engine on and off unnecessarily, which can lower the hybrid vehicle's fuel economy.

BRIEF SUMMARY OF THE DISCLOSURE

In accordance with one embodiment, a method includes determining whether a hybrid vehicle is descending on a downhill grade and operating in an expanded EV mode when road conditions allow for the hybrid vehicle to be powered by a motor. The method further includes exiting the expanded EV mode when the hybrid vehicle is no longer descending on the downhill grade.

In accordance with one aspect, the implementation of the standard EV mode includes operating at a drive power level that is below the internal combustion engine-on power level, enabling the electric motor as a power source for the hybrid vehicle, and preventing the engine from being utilized to power the hybrid vehicle. In some aspects, the standard EV is operated when the hybrid vehicle is operating at speeds ranging from 0 to 45 mph. In other aspects, the expanded EV mode may be operated when the hybrid vehicle is operating at speeds ranging from 45 to 70 mph.

In other aspects, the a driver's driving behavior may be factored to determine whether the hybrid vehicle is descending on a downhill grade. In some aspects, it may be determined that the hybrid vehicle is descending on a downhill grade by determining the degree of depression of an acceleration pedal applied by the driver. In other instances, the rate of application of the acceleration pedal applied by the driver may also be factored to determine the grade of the road. Additionally, the degree of the depression of an acceleration pedal and the rate of application of the acceleration pedal may be determined by sensors located at or near the acceleration pedal. In accordance with another aspect, a vehicle may be determined to be travelling in a downhill grade by obtaining data from a navigation unit comprising map data associated with a proscribed route.

In accordance with another embodiment, a system includes an internal combustion engine, an electric motor operatively connected in parallel to the internal combustion engine, and an electronic control device. In one aspect, the electronic control device is adapted to implement a standard EV under select driving conditions to power the hybrid vehicle, implement an expanded EV mode when the hybrid vehicle is travelling in a downhill grade to power the hybrid vehicle, and draw power from wheels to start the engine when the expanded EV mode is disengaged. In some instances, the motor provides a range of 5 to 20 kW to the engine when the expanded EV mode is disengaged.

In some aspects, the standard EV mode comprises an electric motor as a power source for the hybrid vehicle. In other aspects, the expanded EV mode increases the internal combustion engine start threshold to continually power the hybrid vehicle with the motor even as the hybrid vehicle accelerates.

In further aspects, the electronic control device is adapted to exit the expanded EV mode when the hybrid vehicle is no longer travelling in a downhill grade. In other aspects, the electronic control device may be further adapted to determine whether the hybrid vehicle is travelling in a downhill grade condition by factoring a driver's driving behavior. In some instances, the driving behavior includes factoring a degree of depression of an acceleration pedal and a rate of application of the acceleration pedal applied by the driver.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments

Figure 1A:
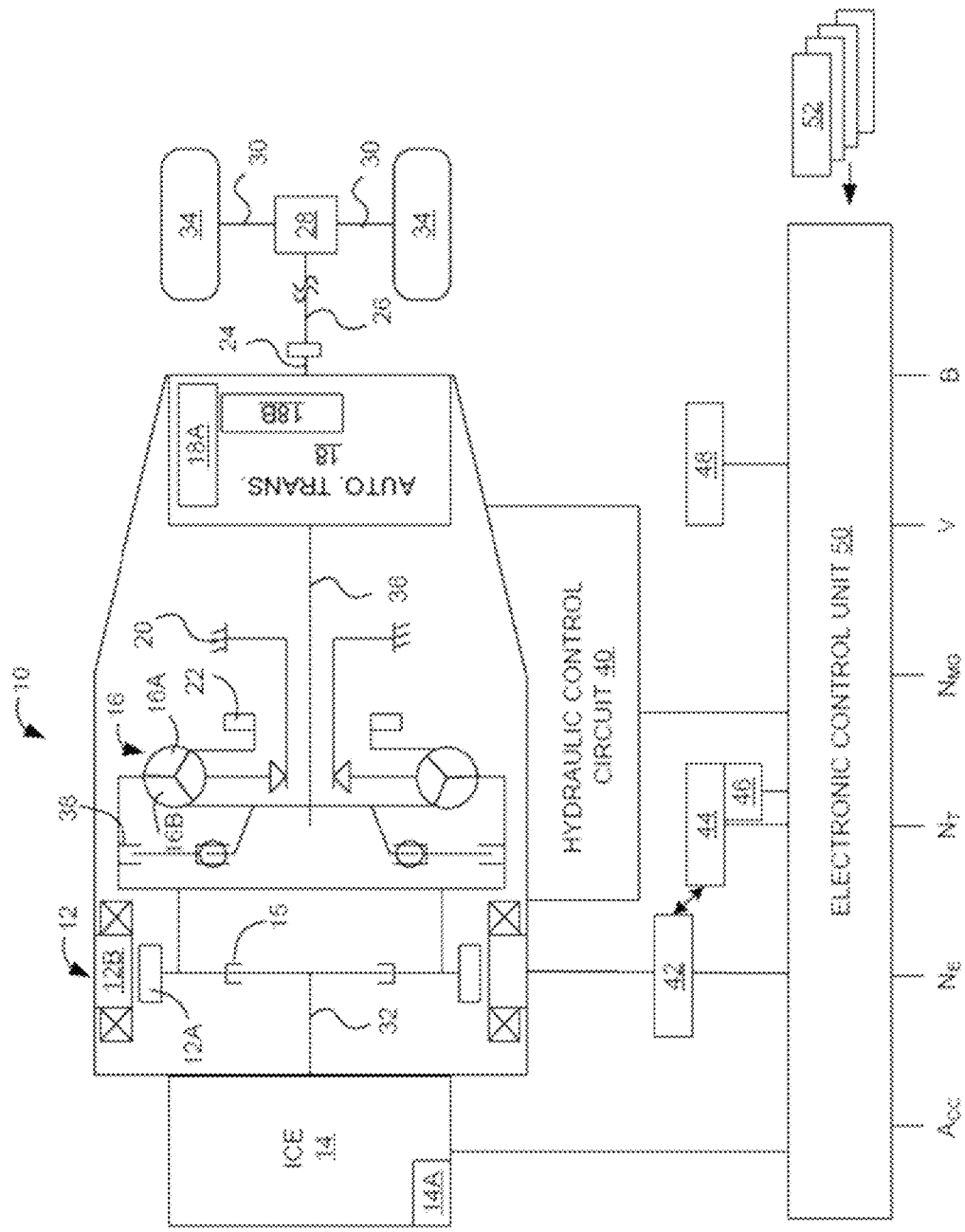
FIG. 1A is a schematic representation of an example hybrid vehicle in which EV driving mode can be implemented in accordance with various embodiments of the disclosure.

The figures are not exhaustive and do not limit the present disclosure to the precise form disclosed.

DETAILED DESCRIPTION

Various embodiments of the present disclosure are directed to operating a hybrid vehicle, e.g., a parallel hybrid vehicle, when it is traveling along downhill grades. Parallel hybrid vehicles can utilize an engine, an electric motor (referred to herein as simply a motor), or both (when coupled) to provide drive power, where the motor and engine may be joined in parallel. Here, reference to hybrid vehicles will include parallel hybrid vehicles.

As alluded to previously, conventional hybrid vehicles may offer an EV travel mode to prevent the engine from turning on so that the conventional hybrid vehicle may operate solely with the motor. However, there are many times where a driver may only be "lightly" accelerating a hybrid vehicle for a short period of time in order to adjust to the road conditions ahead. By way of example, "lightly" may be referred herein to mean maintaining speeds ranging from 45-70 mph and a "short period" may be referred herein to a time frame ranging from 3-5 seconds. Under these conditions, the motor may be fully capable of handling the power requests without significantly depleting the hybrid vehicle's battery. Thus, the conditions under which the EV mode is used can be expanded by temporarily allowing the hybrid vehicle's motor to provide larger drive forces that would otherwise cause conventional hybrid vehicles to exit the EV mode. In this way, situations in which the engine repeatedly turns on and off can be avoided, thereby improving the hybrid vehicle's overall fuel economy.

In some embodiments, the hybrid vehicle may come with a standard EV mode and an expanded EV mode. By way of example, the standard EV mode may be the default EV mode setting when relying on the motor for power and preventing the engine from turning on during select road or driving conditions. For example, the standard EV mode may be initiated automatically by the electronic control unit or upon driver request when the hybrid vehicle is coasting or traveling at low speeds within a predetermined speed threshold range. By way of example, the predetermined speed threshold range may be speeds ranging from 0-45 mph or at speeds capable of being powered by the motor alone when in an EV driving mode. However, when the hybrid vehicle accelerates past 45 mph, or the determined speed threshold range, the standard EV mode may be cancelled and the engine started so that the hybrid vehicle may accelerate at greater speeds. Thus, when the driver is depressing the accelerator to travel at higher speeds, the electronic control unit starts the engine and sends power to the engine to generate sufficient torque to meet the driver's request for greater speed and acceleration, otherwise known as drive power.

By way of further example, the standard EV mode may switch to the expanded EV mode when the hybrid vehicle determines it is on a downhill grade. By way of example, the expanded EV mode may have an expanded threshold, e.g., an expanded range of conditions under which the motor can be utilized to deliver drive power to a transmission, and on to the wheels. Accordingly, under the expanded EV mode, the motor may continue to power the hybrid vehicle during conditions which would normally have resulted in the standard EV mode being overridden, and resulted in the engine being started to supply drive power.

Generally, road conditions such as a downhill grade present an opportunity to use the standard EV mode. This is because a hybrid vehicle may coast downhill without applying the brakes or the accelerator. However, unexpected road conditions or when sections of the road temporarily level or straighten out may require the driver to lightly accelerate for a short period of time. Thus, if the driver is in standard EV mode while driving downhill, the engine will likely be turned on once the driver begins to accelerate, even if the driver intends to immediately revert back to coasting and driving at speeds acceptable within the standard EV mode range. Thus, in some embodiments, standard EV mode may convert to expanded EV mode to prevent unnecessary engine start when travelling in downhill grade road conditions.

FIG. 1A is a schematic representation of an example hybrid vehicle in which EV driving mode can be implemented in accordance with various embodiments of the disclosure. It should be noted that for clarity of the illustration, not all elements of hybrid vehicle 10 are labeled with a reference numeral. For example, in some cases, only one of two or more elements or components of hybrid vehicle 10 are labeled with a reference numeral. However, it can be assumed that the functionality and/or operation of similarly-illustrated elements or components are the same or similar, as would understood by those of ordinary skill in the art unless described otherwise. Moreover, aspects of hybrid vehicle 10 may be described from the perspective of one/one set of elements or components. It can be assumed that secondary instances of those elements or components may operate the same or in a similar manner. It should also be noted that for ease of description and clarity of figures, not all components of a hybrid vehicle have been illustrated, and that the figures and corresponding descriptions are not meant to be limiting. It should be further noted that a hybrid vehicle may embody certain variations with respect to its elements or components, which are contemplated herein. For example hybrid vehicle 10 may be configured with only a single motor.

FIG. 1A includes an example drive system of a hybrid vehicle 10 that may include an engine 14 and a motor 12 as drive sources. Driving force generated by the engine 14 and the motor 12 can be transmitted to a pair of wheels 34 via a torque converter 16, an automatic transmission 18, a differential gear device 28, and a pair of axles 30. Each of the motor 12, the torque converter 16, and the automatic transmission 18 can be housed in a transmission case 20. The transmission case 20 may be a splittable case made of aluminum die cast parts, for example, and fixed to a non-rotating member such as a vehicle body.

Hybrid vehicle 10 may be driven/powered with at least one of the engine 14 and the motor 12 as the drive source for travel. In other words, any one of a plurality of travel modes can be selectively established in the hybrid vehicle 10. A first travel mode may be an engine-only travel mode that only uses the engine 14 as the drive source for travel. A second travel mode may be an EV travel mode that only uses the motor 12 as the drive source for travel. A third travel mode may be an HEV hybrid travel mode that uses the engine 14 and the motor 12 as drive sources for travel. In the engine-only and HEV travel modes, hybrid vehicle 10 travels by using the driving force generated at least by engine 14 while a clutch 15 is engaged. In EV travel mode, hybrid vehicle 10 travels by using the driving force generated by motor 12 while the engine 14 is stopped and clutch 15 is disengaged.

Engine 14 can be an internal combustion engine such as a gasoline engine or a diesel engine of an in-cylinder injection type, where fuel is injected directly into a combustion chamber. An output control device 14A is provided to control drive (output torque) of the engine 14. The output control device 14A includes a throttle actuator that controls opening and closing of an electronic throttle valve, a fuel injection device that controls fuel injection, an ignition device that controls ignition timing, and the like. The output control device 14 A executes output control of engine 14 according to a command control signal(s) supplied from an electronic control unit 50 described below. Such output control can include, for example, control of opening and closing of the electronic throttle valve by the throttle actuator for throttle control. Output control may also include control of fuel injection by the fuel injection device for fuel injection control. Further still, output control may include control of the ignition timing of the ignition device for ignition timing control.

A lock-up clutch 38 that directly connects a pump impeller 16A and a turbine wheel 16B so that they can integrally rotate is provided between pump impeller 16A and the turbine wheel 16B of torque converter 16. The lock-up clutch 38 can be controlled such that its engagement state becomes any one of engagement (complete engagement), slip engagement, and disengagement (complete disengagement) according to hydraulic pressure supplied from a hydraulic control circuit 40. A mechanical hydraulic pump 22 is coupled to the pump impeller 16A of the torque converter 16, and hydraulic pressure generated by hydraulic pump 20 is supplied to hydraulic control circuit 40 as source pressure along with rotation of the pump impeller 16A. Turbine wheel 16B may be coupled to a transmission input shaft 36 that transfers power from motor 12 and/or engine 14 to automatic transmission 18 to which a transmission output shaft 24 is attached. Connected to transmission output shaft 24 is a propeller shaft 26 coupled to differential gear device 28.

Automatic transmission 18 can be a stepped transmission mechanism that selectively establishes any of a plurality of predetermined gears (gear ratios), for example, and is configured to include a plurality of engagement elements to perform such gear ratio changes. Automatic transmission 18 can include a plurality of hydraulic frictional engagement devices, such as multiple disc clutches 18B and brakes 18A whose engagement is controlled by a hydraulic actuator. These hydraulic frictional engagement devices are selectively engaged or disengaged according to the hydraulic pressure supplied from hydraulic control circuit 40. Accordingly, any of a plurality of forward gears (i.e., forward gear positions or forward travel gear positions) or reverse gears (i.e., reverse gear positions or reverse travel gear positions) can be selectively established according to a combination of coupling states of the hydraulic frictional engagement devices. For example, the coupling states of the hydraulic frictional engagement devices can allow for upshifting and downshifting between the forward and reverse gears.

Motor 12 may include a rotor 12A and a stator 12B. Rotor 12A can be rotatably supported around an axis by the transmission case 20. Stator 12B can be integrally fixed to the transmission case 20 on an outer peripheral side of the rotor 12A. Motor 12 can be a motor generator that functions as a motor that generates driving force and a generator that generates reaction force. The motor 12 may be connected to a power storage device, such as a battery 44 and a capacitor via an inverter 42. The electronic control unit 50 described below controls inverter 42, adjusts driving current supplied to or received from coils of the motor 12, and controls driving of the motor 12. That is, output torque of the motor 12 can be increased or decreased by electronic control unit 50 through the inverter 42.

Ina power transmission path between engine 14 and motor 12, clutch 15 controls power transmission in the power transmission path according to an engagement state. That is, a crankshaft 32 that is an output member of the engine 14 is selectively coupled to the rotor 12A of the motor 12 via clutch 15. Rotor 30 of the motor MG is coupled to a front cover that is an input member of the torque converter 16. Clutch 15 is, for example, a multiple disc type hydraulic frictional engagement device whose engagement is controlled by a hydraulic actuator. Clutch 15 is controlled such that its engagement state is controlled to achieve engagement (complete engagement), slip engagement, and disengagement (complete disengagement) modes according to hydraulic pressure supplied from the hydraulic control circuit 40. That is, a torque capacity of clutch 15 is controlled according to the hydraulic pressure supplied from the hydraulic control circuit 40. When clutch 15 is engaged, power transmission is provided in the power transmission path between the crankshaft 32 and the front cover of the torque converter 16. On the other hand, when clutch 15 is disengaged, power transmission is blocked from being delivered to the power transmission path between the crankshaft 32 and the front cover of the torque converter 16. In a slip engagement state or mode, clutch 15 is engaged, and power transmission according to a torque capacity (transmission torque) of the clutch 15 is provided to the power transmission path between the crankshaft 32 and the front cover of the torque converter 16.

Hybrid vehicle 10 may include an electronic control unit 50. Electronic control unit 50 may include a microcomputer that includes a CPU, a RAM, a ROM, an input-output interface, and the like. In electronic control unit 50, the CPU utilizes a temporary storage function of the RAM to perform signal processing according to a program in advance stored in the ROM. Accordingly, the electronic control unit 50 executes various kinds of control such as drive control of the engine 14, drive control of the motor 12, speed change control of the automatic transmission 18, engagement force control of the clutch 15, engagement control of the lock-up clutch 38, and the like. The electronic control unit 50 may be separately configured with a plurality of control devices such as for control of the engine 14, control of the motor 12, control of the automatic transmission 18, and control of the clutch 15 according to necessity and may execute each control through communication of information with each other. In this embodiment, the electronic control unit 50 corresponds to the control device of the hybrid vehicle 10. Furthermore, the electronic control unit 50 may include various software, such as recognition software to identifying certain key indicators or select objects. By way of example, the recognition software may be used to identify specific road signs or environmental indicators that a hybrid vehicle is travelling on a downhill gradient.

As shown in FIG. 1A, the electronic control unit 50 is supplied with various kinds of input signals detected by each sensor provided in the hybrid vehicle 10. For example, electronic control unit 50 may receive signals that indicate an accelerator operation amount $A_{CC}$, a revolution speed $N_E$ of the engine 14 (engine revolution speed), a rotational speed $N_T$ of the turbine wheel 16B (turbine rotational speed), a rotational speed $N_{MG}$ of the motor 12 (motor rotational speed), a vehicle speed V, and energy storage amount (remaining capacity, charged amount), e.g., battery SOC of battery 44. It should be noted that more signals indicative of other operational aspects of hybrid vehicle 10 can be received by electronic control unit 50, e.g., a temperature of motor 12, coolant temperature of hybrid vehicle 10, intake air amount of engine 14, etc.

Electronic control unit 50 can receive the input signals from various sensors 52 configured to sense relevant operational characteristics of hybrid vehicle 10. For example, accelerator operation amount $A_{CC}$ can be detected by an accelerator operation amount sensor that determines the degree to which an accelerator pedal is depressed/actuated. For example, brake operation amount B can be detected by a foot brake sensor. For example, engine revolution speed $N_E$ can be detected by an engine revolution speed sensor. The turbine rotational speed $N_T$ can be detected by a turbine rotational speed sensor. The motor rotational speed $N_{MG}$ can be detected by a motor rotational speed sensor. Vehicle speed V can be detected by a vehicle speed sensor. Battery SOC can be detected by an SOC sensor 46. Another example of a sensor 52 may be a positioning or location sensor, such as a Global Positioning System (GPS) receiver that can provide location information corresponding to a location of hybrid vehicle 10.

Additionally, electronic control unit 50 can receive input signals from a network interface device 48. Network interface device 48 may receive information such as map data, road conditions information (e.g., upcoming road slope/grade information, upcoming turn information, etc.), traffic information, and the like from one or more information service providers. Instead of relying solely on a GPS receiver, a location of hybrid vehicle 10 may be determined from information received by network interface device 48.

Electronic control unit 50 can supply various output signals to one or more devices/components/elements provided in hybrid vehicle 10. For example, the electronic control unit 50 can supply signals to output control device 14A of the engine 14 to effectuate drive control of the engine 14. Electronic control unit 50 can supply signals to inverter 42 for effectuating drive control of the motor 12. Electronic control unit 50 can supply signals to a plurality of electromagnetic control valves in the hydraulic control circuit 40 for speed control of the automatic transmission 18. Electronic control unit 50 may supply signals to a linear solenoid valve in the hydraulic control circuit 40 for engagement control of the clutch 15. Electronic control unit 50 can also supply signals to the linear solenoid valve in the hydraulic control circuit 40 for engagement control of the lock-up clutch 38, line pressure control, and the like. Furthermore, the electronic control unit 50 may also supply signals to a vehicle camera to control the view angle of the vehicle camera. The camera feed obtained from the vehicle camera may then be used to environmental conditions of the road ahead.

Figure 1B:
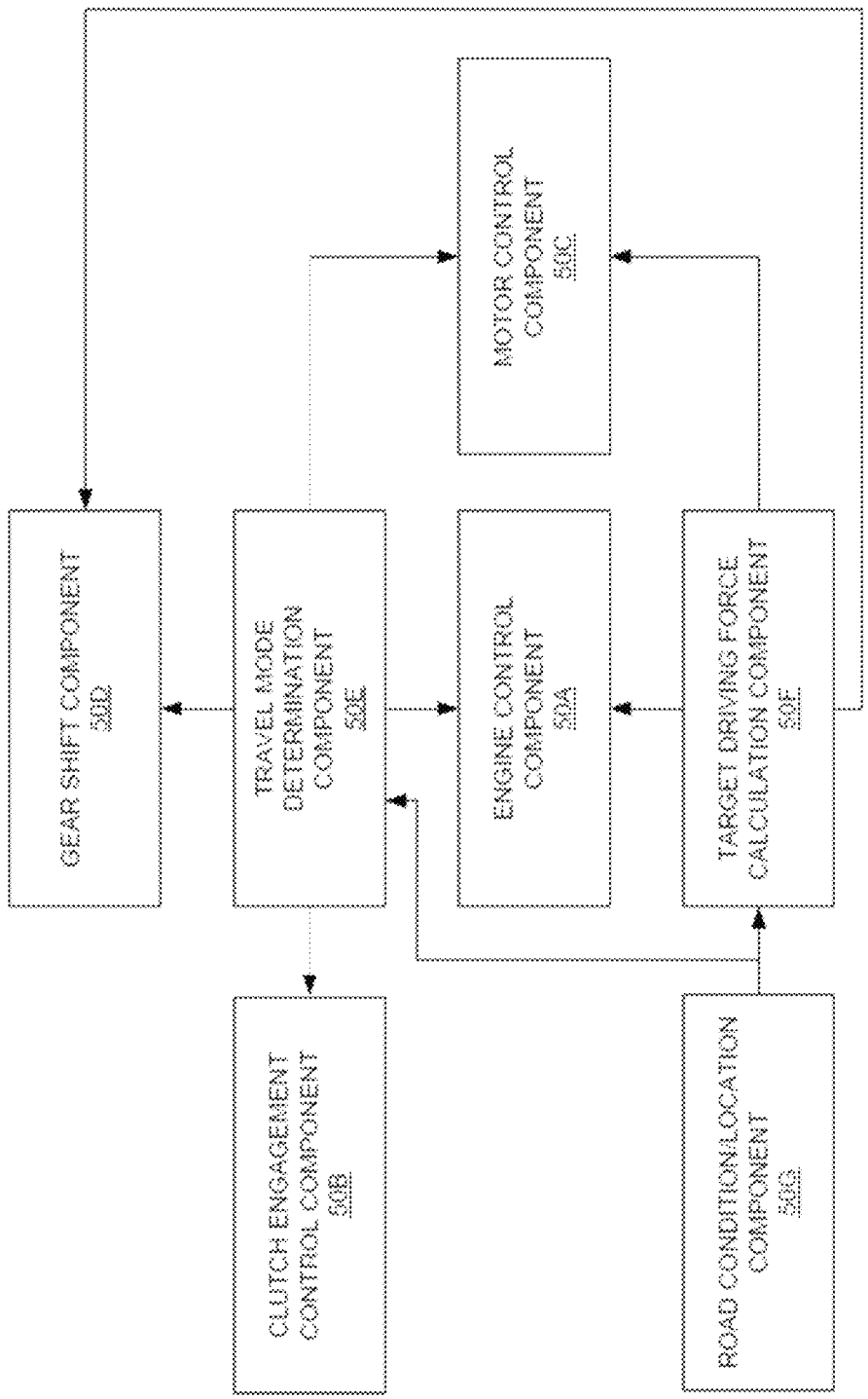
FIG. 1B is a functional block diagram illustrating component parts of a control function included in an electronic control unit of the hybrid vehicle illustrated in FIG. 1A.

FIG. 1B is a functional block diagram that illustrates example parts of a control function included in the electronic control unit 50. An engine control component 50A shown in FIG. 1B controls the drive (output torque) of the engine 14 via the output control device 14A. Specifically, engine control component 50A controls output control device 14A by way of a throttle valve opening of an electronic throttle valve, controlling the amount of fuel supplied by the fuel injection device, the ignition timing of the ignition device, etc. Accordingly, electronic control unit 50 controls the manner in which engine 14 provides drive power so that engine output required by engine 14 can be achieved.

Engine control component 50A drives engine 14 in the engine-only and HEV travel modes. For example, engine control component 50A may control when engine 14 is started, e.g., when switching from EV travel mode to the engine-only travel mode or the HEV travel mode. This can occur when hybrid vehicle is transitioning from the EV travel mode to the HEV travel mode. Likewise, engine control component 50A may control when engine 14 is shut off, e.g., when switching from engine-only or HEV travel mode to EV travel mode.

To control engine 14, clutch 15 may be engaged (slip or complete engagement) so as to connect engine 14 to the power transmission path. This can be accomplished by clutch engagement control component 50B, described below. Engine control component 50A can instruct engine 14 to revolve resulting in an engine revolution speed $N_E$, and the supply of fuel to engine 14 is started via the output control device 14A.

When hybrid vehicle 10 is to be operated in EV mode, as can be done when traveling downhill, for example, engine control component 50A outputs a control signal(s) to output control device 14A for stopping engine 14. Clutch 15 may be disengaged, and engine 14 is stopped. Moreover, output control device 14A may be commanded to stop the supply of fuel to engine 14.

As alluded to previously, clutch engagement control component 50B performs engagement control of the clutch 15 via the linear solenoid valve included in the hydraulic control circuit 40 by controlling current supplied to the linear solenoid valve. The hydraulic pressure supplied from the linear solenoid valve to the hydraulic actuator included in the clutch 15 as a result of the supplied current effectuates engagement/disengagement of the clutch 15.

A motor control component 50C controls actuation of the motor 12 via the inverter 42. Specifically, electric energy is supplied from battery 44 to motor 12 via inverter 42. Motor control component 50C outputs a control signal(s) for driving motor 12 to rotate and generate positive or negative motor torque to obtain the output required of the motor 12. For example, motor control component 50C outputs a control signal(s) to switch inverter 42 so that current is flowing to battery 44 so as to generate negative motor torque such that hybrid vehicle 10 decelerates.

A gear shift component 50D can output a control signal(s) instructing engagement/disengagement of one or more hydraulic frictional engagement devices through hydraulic control circuit 40 to effectuate a downshift to a lower gear ratio from a current gear ratio. The downshift can be initiated by a control signal(s) from a travel mode determination component 50E, described below.

A travel mode determination component 50E can make determinations regarding a travel mode established in hybrid vehicle 10 based on road conditions as described below. A road conditions/location component 50G can make determinations regarding a location of hybrid vehicle 10, as well as upcoming road conditions. In one embodiment, road conditions/location component 50G may embody a navigation unit commonly found in many modern vehicles, hybrid or otherwise. Road conditions/location component 50G may receive information regarding road conditions from network interface device 48 and/or a GPS receiver, which may be one embodiment of a sensor 52. For example, the location of hybrid vehicle at any point during its travel can be determined, e.g., by the GPS receiver, and this location can be correlated with road conditions information relevant to that location.

For example, upon startup or during operation of hybrid vehicle 10, road conditions/location component 50G may determine a route to be traveled is known. The route may be known if an address, point of interest identifier, etc. is provided to a road conditions/location component 50G, for example, by a driver of hybrid vehicle 10, via navigation system user interface. Road conditions/location component 50G may have or receive maps or map information indicative of the route to be traveled along with road conditions, e.g., any downhill grades present/expected along the route.

If the route is not known, road conditions/location component 50G may predict a route. Route prediction methods and systems are known in the art, and any of a variety of route prediction systems or methods can be used to predict the route in accordance with various embodiments. In some embodiments, the road conditions/location component 50G and/or the GPS receiver will predict one or more potential routes and a likelihood of each predicted route. For example, if the likelihood of a first route being correct is 80 percent (80%) and the likelihood for each of 4 other routes is 5 percent (5%), the road conditions/location component 50G can assume that the route will be the first route.

Road conditions/location component 50G may determine whether hybrid vehicle 10 is approaching a downhill grade based on data stored in a memory (such as map data), data received via a network interface device 48 (such as streaming map data, periodic local travel information), or data detected by one or more sensors (such as an accelerometer, a camera or the like). In some embodiments, the road conditions/location component 50G may determine that hybrid vehicle 10 is approaching a downhill grade when hybrid vehicle 10 is within a predetermined distance of the downhill grade such as 2 miles, 1 mile, ½ of a mile, ¼ of a mile, 1/10 of a mile, or within any other predetermined distance. Road conditions/location component 50G may determine whether data corresponding to the downgrade is known.

When a hybrid vehicle determines that it is operating downhill, the operation of the engine and/or motor may be adjusted accordingly in order to operate in a travel mode that provides the most fuel economic driving range and prevents the depletion of the battery 44. This can be done, for example, by implementing an EV driving mode so that the motor is used to power the hybrid vehicle. Because downhill road conditions typically allow the hybrid vehicle to coast throughout most of the downhill sections of the road, such road conditions are ideal for EV driving mode. Thus, in one embodiment, the travel mode determination component 50E can implement an EV driving mode when the road conditions/location component 50G determines that hybrid vehicle is descending downhill.

Additionally, when a target driving force calculation component 50F (described below) determines that the motor is sufficiently capable of providing the necessary power to the wheels to in order to move the hybrid vehicle forward, the target driving force calculation component 50F may instruct the travel mode determination component 50E to select from one or more EV driving modes. In some embodiments, the travel mode determination component may select from a standard EV mode and an expanded EV mode.

The travel mode determination component 50E may implement a standard EV mode or an expanded EV mode if the road condition/location component 50G is associated with driving conditions where the hybrid vehicle may be powered by the motor control component 50C. To further determine if the motor control component 50C is indeed capable of providing the necessary power to the hybrid vehicle without depleting the battery, road conditions/location component 50G can, in conjunction with target driving force calculation component 50F may be used.

The target driving force calculation component 50F, as further described below, can determine whether or not battery 44 should be depleted in anticipation of an upcoming road conditions. In accordance with various embodiments, target driving force calculation component 50F can calculate a target driving force depending on the characteristics of an upcoming downgrade and how far away hybrid vehicle 10 is from the upcoming downgrade. Based on this information, target driving force calculation component 50F can determine how much electrical energy will be generated by hybrid vehicle 10 traversing the downgrade. The amount of electrical energy that will be generated going downhill is the amount of electrical energy that should be dissipated by battery 44. In this way, by the time hybrid vehicle 10 reaches/begins traveling downhill, the battery SOC of battery 44 will be in a condition to be completely replenished by the time hybrid vehicle 10 reaches the end of the downgrade. Thus, if the target driving force calculation component 50F determines that such road conditions are suitable for operating with a motor, the travel mode determination component 50E may implement a standard EV mode or an expanded EV mode.

Additionally, the target driving force may determine how much electrical energy will be generated by implementing the current driving conditions applied to the hybrid vehicle 10 itself. For example, target driving force calculation component 50F can deduce (calculate) a target driving force that is a target value of the driving force to be transmitted to wheels 34, e.g., on the basis of a detected accelerator operation amount $A_{cc}$, detected vehicle speed V, and the like. Target driving force calculation component 50F may output control signals to one or more of engine control component 50A and motor control component 50C to control the drive of engine 14 and the action of motor 12 to achieve the target driving force. In an engine-on/HEV mode, the engine control component 50A controls the drive of the engine 14 with the target driving force calculated by the target driving force calculation component 50F as the target engine output. In a EV/HEV mode, motor control component 50C controls driving motor 12 with the target driving force calculated by target driving force calculation component 50F.

Thus, if target driving force calculation component 50F determines that the motor control component is sufficient to power the hybrid vehicle 10, the travel mode determination component 50E may implement a standard EV mode as the determined travel mode. Additionally, if the road condition/location component 50G determines that the road is downhill and the target driving force calculation component 50F determines that the motor component 50E is sufficient to power the hybrid vehicle downhill, the travel mode determination component 50E may implement an expanded EV mode as the determined travel mode. However, the hybrid vehicle is being driven in an EV mode that surpasses the target driving force for the motor, the electronic control unit may cancel the EV mode and revert to engine-on mode.

It should be understand that the above determination is only an example, and those of ordinary skill in the art would know of and could apply other methods of determining the amount of electrical energy that may be captured while traveling along one or more downgrades.

Figure 2:
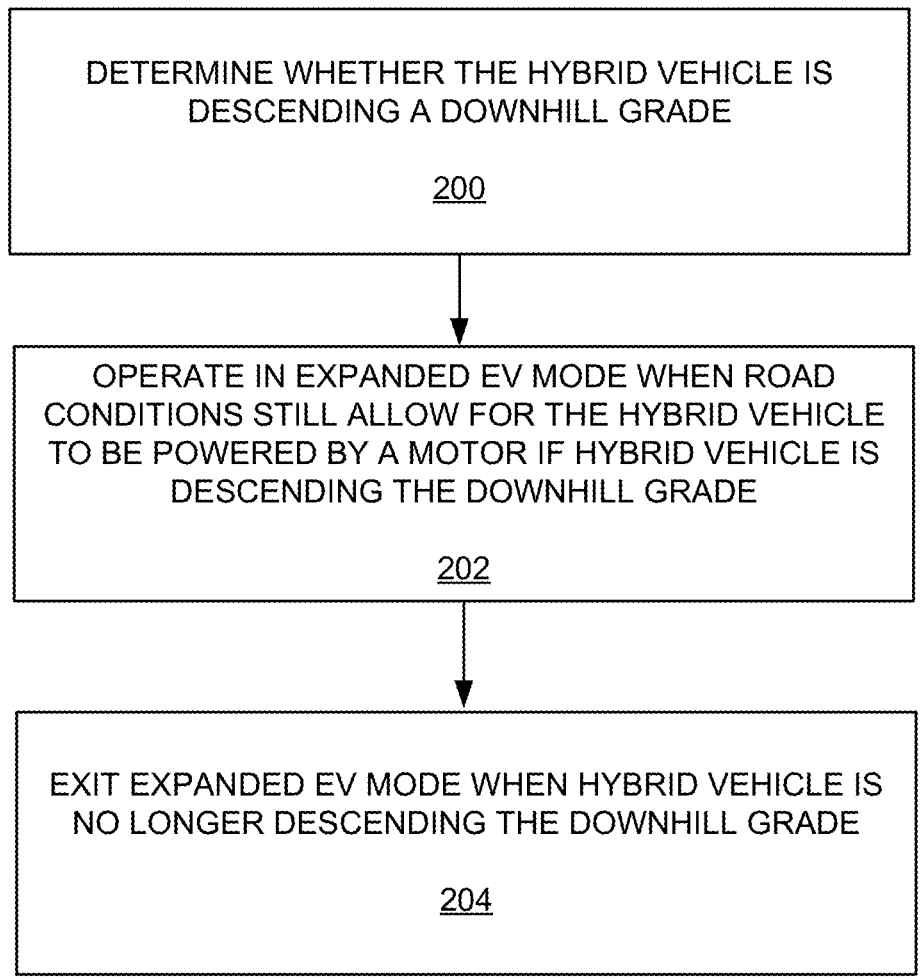
FIG. 2 is a flow chart illustrating example operations for implementing an expanded EV mode of a hybrid vehicle during downhill grade road conditions in accordance with various embodiments of the present disclosure.

FIG. 2 is a flow chart illustrating example operations for implementing an expanded EV mode of a hybrid vehicle during downhill grade road conditions in accordance with various embodiments of the present disclosure. At operation 200, the electronic control unit of the hybrid vehicle, e.g., electronic control unit 50 of hybrid vehicle 10 may determine whether the hybrid vehicle is currently descending a downhill grade. For example, in one embodiment, the electronic control unit may utilize an accelerometer to determine the grade of the road. Because of the relationship between gravitational acceleration and inclination, various types of accelerometers may be used to determine the incline of the hybrid vehicle. To obtain such an incline determination, the accelerometer may employ an axis determining a line parallel to the ground surface and measuring the degree of tilt, forward or backward, of the hybrid vehicle at a given moment in time utilizing the following formula:

$$\text{Road gradient} = \arcsin\left(\frac{\text{measured acceleration}}{\text{gravitation force}}\right)$$

Additionally, because side-to-side tilt is also relevant to an acceleration measurement, all accelerometers may have at least two axes.

By way of further example, an inclinometer may also be used to determine the gradient of the road. An inclinometer is an instrument that measures the angles of slope and inclination with respect to gravity by creating an artificial horizon. Other names for the inclinometer may include a tilt sensor, tilt indicator, slope meter, slope gauge, gradient meter, etc.

In some embodiments, as described above, a road conditions/location component 50G may embody a navigation unit to receive information regarding road conditions, which may include road slope and grade information. Based on such information, the electronic control unit can determine whether the vehicle is operating on a downhill grade.

By way of further example only, the hybrid vehicle may also use various sensors and network interface devices to help determine the gradient of the road. By way of example, the electronic control unit may receive the camera feed from the vehicle, where the recognition software in the electronic control unit may look for key environmental indicators that suggest the hybrid vehicle is travelling downhill. By way of example, such environmental indicators may include recognizing and deciphering road signs. For example, the recognition software may detect a road sign and recognize that the particular sign illustrates a truck positioned at a declined angle, indicating the downhill road condition ahead. Thus, the recognition software may be able to determine road conditions, where such information may be relayed to the road condition/location component of the electronic control unit.

In further embodiments, the hybrid vehicle may utilize the driver's driving behavior to help further confirm whether the hybrid vehicle is travelling on a downhill grade. For example, the electronic control unit may receive signals from an accelerator senor to detect how much the accelerator is depressed by the driver. By factoring the depression level of the accelerator, this may provide a helpful indication as to whether the driver's request for drive power can be sufficiently handled by the standard EV mode or the expanded EV mode. For example, the degree at which the accelerator is depressed by the driver may translate into the speed and rate of acceleration the driver is attempting to carry out.

Thus, a greater depression of the accelerator means a greater amount of torque has to be delivered to the wheels to allow them to spin fast enough to meet the desired speed and acceleration characterized. Furthermore, this also means that the electronic control unit must send more current to the motor through an inverter. However, if there is not sufficient torque to meet the desired speed and acceleration as indicated by the accelerator's degree of depression, the electronic control unit may then start the engine. This is because the motor alone will be incapable of providing such torque needed to be delivered to the wheels to allow them to spin fast enough to meet the desired speed and acceleration characterized.

As such, because a driver is not likely to accelerate at high speeds when driving in a downhill grade, a light depression of the accelerator may be considered an indication that the driver is more likely to be travelling in a downhill grade road condition. However, if the accelerator is depressed where it translates to high acceleration and speed, this may be considered an indication that the driver is more likely to be travelling in a non-downhill grade (e.g., level or uphill grade) road condition.

Additionally, by way of further example, another factor to help determine whether the hybrid vehicle is travelling on a downhill grade is to consider the rate of application of the acceleration pedal. By way of example, the electronic control unit may receive signals from the accelerator sensor to detect the rate of application of the acceleration pedal. For example, if a driver is quickly depressing the accelerator, the rate at which accelerator is depressed may translate to determining the speed and acceleration at which the driver wishes to travel. Thus, taking into consideration taking a rate of application of the acceleration pedal may help determine whether the motor may have sufficient power to deliver the requested speed and acceleration.

Thus, a greater rate at which the accelerator is depressed may indicate that a greater amount of torque has to be delivered to the wheels to allow them to spin fast enough to meet the quick speed and acceleration characterized. Because a quicker depression of the accelerator means that the driver is seeking to quickly accelerate at high speeds, there may not be not sufficient motor torque to meet the desired speed and acceleration as translated by the rate of the depression of the accelerator. Where the rate of depression of the accelerator is too high to be met by the motor alone as determined by the target driving force calculation component, the electronic control unit may then start the engine to deliver the necessary speed and acceleration as characterized. Thus, by factoring driver behavior such as pedal depression and rate of application of the acceleration pedal, these factors alone or in combination may help determine whether expanded EV mode is the appropriate driving mode to power the hybrid vehicle.

At operation 202, the hybrid vehicle utilizes expanded EV mode when the hybrid vehicle determines it is operating during downhill grade conditions, and if those downhill grade conditions allow for the hybrid vehicle to remain powered by the motor. By way of example, the electronic control unit may use information from the road condition/location component to determine if the hybrid vehicle has reached a downgrade section of the road. Additionally, the target driving force calculation component may further determine if such downhill grade conditions are suitable with the expanded EV mode.

By way of example, the expanded EV mode may include an increased drive power improvement so that the hybrid vehicle may continue to operate solely with the motor via the motor control component. Because the expanded EV mode is configured as a driving mode with increased drive power improvement, the hybrid vehicle may operate in an EV driving mode even past the motor usage threshold established for the standard EV mode. Thus when the target driving force calculation component determines that the motor control component may provide sufficient motor torque to power the hybrid vehicle, the expanded EV mode may be implemented.

By way of example, if the electronic control unit sets the standard EV mode to operate at a motor threshold ranging from 0-45 mph, the expanded EV mode may have an increased drive power range that allows the hybrid vehicle to operate even at speeds past 45 mph. By way of example, the expanded EV mode may have an increased motor threshold so that the hybrid vehicle may operate at speeds ranging from 45-70 mph. Thus, in the expanded EV mode, the hybrid vehicle may continue to use the motor and prevent the starting of the engine even when the hybrid vehicle temporarily accelerates. However, it should be noted that for the motor threshold range for the expanded EV mode must be deemed acceptable by the target driving force calculation component.

At operation 204, the electronic control unit may exit the expanded EV mode when the hybrid vehicle is no longer descending the downhill grade. The electronic control unit may determine that the hybrid vehicle is no longer on a downhill grade based on the information provided by the road condition/location component and the target driving force calculation component.

In non-downhill grade road conditions, the hybrid vehicle may enter standard EV mode when such road and driving conditions allow the motor to be powered within the motor threshold range acceptable for the standard EV mode. However, where the non-downhill grade conditions do not provide the necessary driving conditions to be powered by the motor alone, the electronic control unit may command the engine to start via the engine control component so that the engine alone or in combination with the motor may power the hybrid vehicle.

Figure 3A:
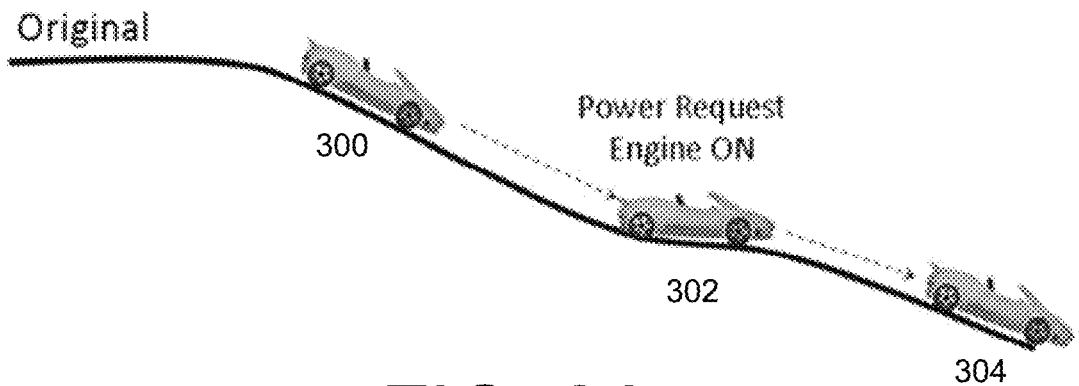
FIG. 3A is a diagram representation of a hybrid vehicle operating in standard EV mode in a downhill grade in accordance with various embodiments of the present disclosure.

FIG. 3A is a diagram representation of a hybrid vehicle operating in standard EV mode in downhill grade conditions in accordance with various embodiments of the present disclosure. As illustrated, if the hybrid vehicle is traveling downhill at 300, such road conditions are likely suited for standard EV mode. However, if the hybrid vehicle is not equipped with expanded EV mode and road conditions flatten out as indicated at 302, the standard EV mode will be cancelled and the engine will be started in order to accommodate the driver's higher drive power as the driver accelerates.

Additionally, the hybrid vehicle may revert back to standard EV mode when the road continues to proceed in downhill gradient conditions at 304. However, this switching on and switching off of the engine may be unnecessary when such driver power requests are at flattened road conditions at 202 and may sufficiently be powered by the motor alone. Thus, increasing the power availability granted may help improve overall fuel economy, especially when driving downhill.

Figure 3B:
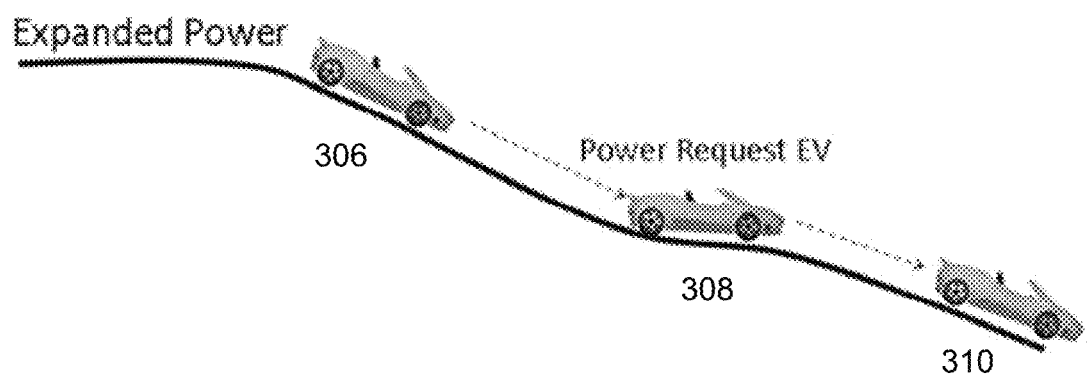
FIG. 3B is a diagram representation of a hybrid vehicle operating in expanded EV mode in a downhill grade in accordance with various embodiments of the present disclosure.

FIG. 3B is a diagram representation of a hybrid vehicle operating in expanded EV mode in downhill grade conditions in accordance with various embodiments of the present disclosure. While the standard EV mode in FIG. 3A was automatically cancelled and converted to engine power when the driver accelerated at flattened roads at 202, here FIG. 2B depicts a different outcome with the use of expanded EV mode.

For example, when the hybrid vehicle is travelling downhill at 306, again, such road conditions may be well suited to deploy even standard EV mode. However, because the standard EV mode may be modified to provide an expanded motor usage threshold, the hybrid vehicle may continue to use expanded EV mode even when the driver lightly accelerates for short periods as the road flattens out at 308.

Additionally, when the road continues at a downhill gradient at 310, the hybrid vehicle may continue to be in the expanded EV mode since the hybrid vehicle is likely operating in conditions capable of being powered by the motor alone. The hybrid vehicle's target driving force calculation may use information from the road condition/location component and the travel mode determination component to determine if the current driving and road conditions may be powered by the expanded EV mode. However, by way of example, if the hybrid vehicle operates at any time outside the established conditions and motor usage threshold of the standard EV mode or the expanded EV mode, the engine may then start and begin to the power the hybrid vehicle.

Figure 4:
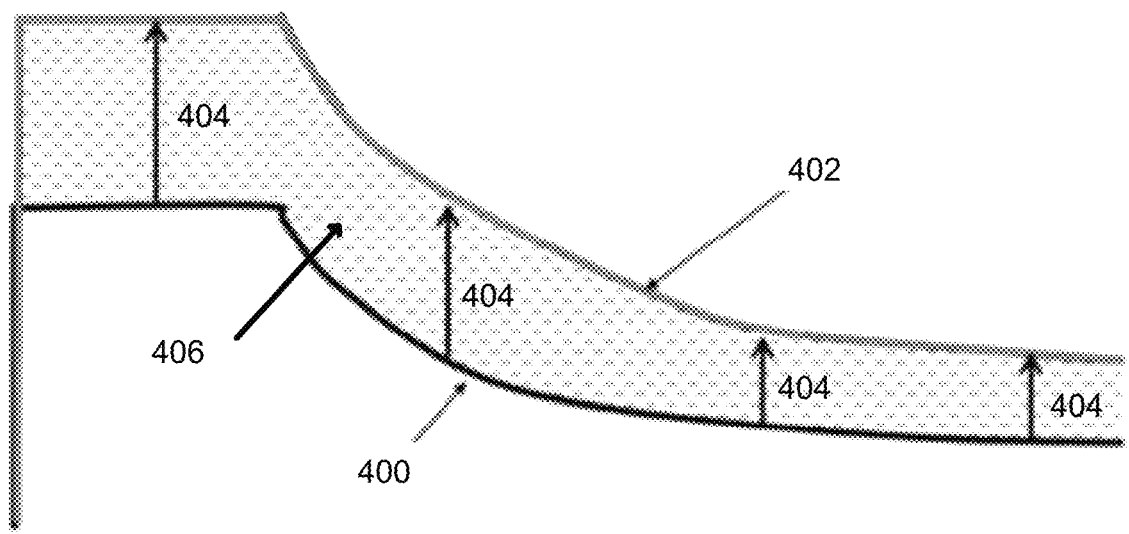
FIG. 4 is a diagram representation of an increased motor power curve representing the increase motor power threshold for expanded EV mode in accordance with various embodiments of the present disclosure.

FIG. 4 is a diagram representation of an increased motor power curve representing the increase motor power threshold for expanded EV mode in accordance with various embodiments of the present disclosure. As illustrated, the increase motor power curve is associated with the expanded EV mode while the normal motor power curve 400 is associated with the standard EV mode. Here, by way of example, the standard EV mode may be switched off and the engine turned on when the hybrid vehicle enters a engine threshold 406 associated with the standard EV mode. By way of example, the hybrid vehicle may enter the engine threshold 406 when it is being driven in road conditions where the driver accelerates past a determined speed, such as 45 mph. The engine threshold 406 and the motor threshold may be determined by the target driving force calculation component 50F to ensure that the hybrid vehicle is powered by the appropriate power source.

However, as described above with reference to FIG. 2, an expanded EV mode may increase the motor power threshold so that the hybrid vehicle may continue to rely on the motor as a power source even when the hybrid vehicle is lightly accelerating. As illustrated in FIG. 4, the expanded EV mode is represented with the increased motor power curve 402. In the expanded EV mode, the motor threshold is increased so that the engine threshold 406 is increased and no longer the same for the expanded EV mode.

Furthermore, when the engine is turned on when the expanded EV mode is disengaged, some of the power may be drawn from the motor to help start the engine. By doing so, this may prevent drawing power from the wheels to start the engine, which may cause the hybrid vehicle to suddenly decelerate and result in an uncomfortable driving experience for the driver. By way of example only, a range of 5 to 20 kW may be drawn from the motor to help start the engine.

Figure 5:
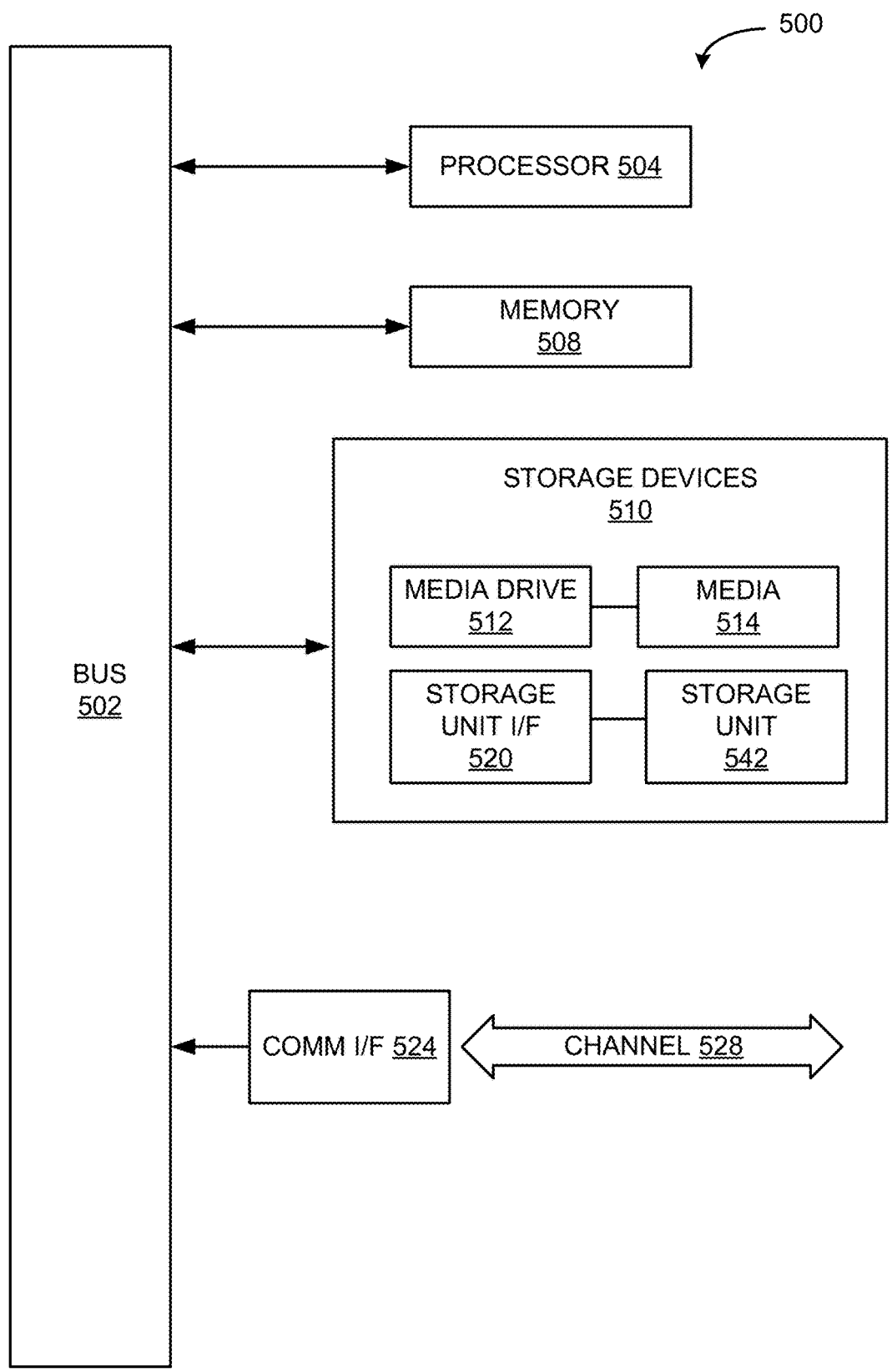
FIG. 5 is an example computing component that may be used to implement various features of embodiments described in the present disclosure.

As used herein, the term component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 5. Various embodiments are described in terms of this example-computing component 500. After reading this description, it will become apparent to a person skilled in the relevant art how to implement the application using other computing components or architectures.

Referring now to FIG. 5, computing component 500 may represent, for example, computing or processing capabilities found within computer processing units or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example, electronic devices that might include some form of processing capability.

Computing component 500 might include, for example, one or more processors, controllers, control components, or other processing devices. This can include a processor, and/or any one or more of the components making up electronic control device hydraulic control circuit, or other components or elements of vehicle, e.g., signal sensors, etc. Processor 504 might be implemented using a general-purpose or special-purpose processing engine such as, for example, a microprocessor, controller, or other control logic. Processor 404 may be connected to a bus 502. However, any communication medium can be used to facilitate interaction with other components of computing component 400 or to communicate externally.

Computing component 500 might also include one or more memory components, simply referred to herein as main memory. For example, random access memory (RAM) or other dynamic memory, might be used for storing information and instructions to be executed by processor 504. Main memory 508 might also be used for storing temporary variables or other intermediate information during execution of instructions to be executed by processor 504. Computing component 500 might likewise include a read only memory ("ROM") or other static storage device coupled to bus 502 for storing static information and instructions for processor 504.

The computing component 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a solid state drive, a magnetic tape drive, an optical drive, a compact disc (CD) or digital video disc (DVD) drive (R or RW), or other removable or fixed media drive might be provided. Storage media 514 might include, for example, a hard disk, an integrated circuit assembly, magnetic tape, cartridge, optical disk, a CD or DVD. Storage media 514 may be any other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing component 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory component) and memory slot. Other examples may include a PCMCIA slot and card, and other fixed or removable storage units 522 and interfaces 520 that allow software and data to be transferred from storage unit 522 to computing component 500.

Computing component 500 might also include a communications interface 524. Communications interface 524 might be used to allow software and data to be transferred between computing component 500 and external devices. Examples of communications interface 524 might include a modem or softmodem, a network interface (such as an Ethernet, network interface card, WiMedia, IEEE 802.XX or other interface). Other examples include a communications port (such as for example, a USB port, IR port, RS232 port Bluetooth® interface, or other port), or other communications interface. Software/data transferred via communications interface 524 may be carried on signals, which can be electronic, electromagnetic (which includes optical) or other signals capable of being exchanged by a given communications interface 524. These signals might be provided to communications interface 524 via a channel 528. Channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 400 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method comprising:
   determining whether a hybrid vehicle is descending on a downhill grade;
   operating in an expanded EV mode when road conditions still allow for the hybrid vehicle to be powered by a motor when the hybrid vehicle is descending on the downhill grade; and
   exiting the expanded EV mode when the hybrid vehicle is no longer descending on the downhill grade.

2. The method of claim 1, wherein implementation of a standard EV mode comprises determining a drive power level that is an internal combustion engine-on power level, enabling the motor as a power source for the hybrid vehicle, and preventing the internal combustion engine from being utilized to power the hybrid vehicle.

3. The method of claim 1, further comprises operating in a standard EV mode when the hybrid vehicle is operating at speeds ranging from 0 to 45 mph.

4. The method of claim 1, wherein determining whether the hybrid vehicle is descending on the downhill grade comprises factoring a driver's driving behavior.

5. The method of claim 4, wherein factoring the driver's driving behavior comprises determining a degree of depression of an acceleration pedal applied by the driver.

6. The method of claim 5, wherein factoring the driver's driving behavior comprises determining a rate of application of the acceleration pedal applied by the driver.

7. The method of claim 6, wherein the degree of depression of the acceleration pedal and the rate of application of the acceleration pedal are determined by sensors at the acceleration pedal.

8. The method of claim 1, wherein determining whether a vehicle is travelling in the downhill grade comprises obtaining data from a navigation unit comprising map data associated with a proscribed route.

9. The method of claim 1, wherein the expanded EV mode increases a motor threshold for providing more power from the motor to wheels of the hybrid vehicle.

10. The method of claim 1, wherein the expanded EV mode operates at speeds ranging from 45 to 70 mph.

* * * * *